(12) United States Patent
Kim (10) Patent No.: US 9,978,126 B2
(45) Date of Patent: *May 22, 2018

(54) IMAGE RESOLUTION MODIFICATION

(71) Applicant: EMPIRE TECHNOLOGY DEVELOPMENT LLC, Wilmington, DE (US)

(72) Inventor: Seungil Kim, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/612,057

(22) Filed: Jun. 2, 2017

(65) Prior Publication Data

US 2017/0270641 A1   Sep. 21, 2017

Related U.S. Application Data

(63) Continuation of application No. 14/785,647, filed as application No. PCT/US2014/036065 on Apr. 30, 2014, now Pat. No. 9,710,893.

(51) Int. Cl.
| | |
|---|---|
| *G06K 9/00* | (2006.01) |
| *G06T 5/00* | (2006.01) |
| *H04N 1/00* | (2006.01) |
| *H04N 1/32* | (2006.01) |
| *H04N 1/38* | (2006.01) |
| *H04N 7/18* | (2006.01) |

(52) U.S. Cl.
CPC ......... *G06T 5/001* (2013.01); *H04N 1/00307* (2013.01); *H04N 1/00973* (2013.01); *H04N 1/32117* (2013.01); *H04N 1/38* (2013.01); *H04N 7/183* (2013.01); *H04N 2201/325* (2013.01); *H04N 2201/3254* (2013.01)

(58) Field of Classification Search
CPC ......... G06T 5/001; G06T 5/00; H04N 21/485; H04N 7/183; H04N 1/00127; H04N 2201/0067
See application file for complete search history.

(56) References Cited

U.S. PATENT DOCUMENTS

| | | |
|---|---|---|
| 5,978,522 A | 11/1999 | Ishii |
| 6,122,411 A | 9/2000 | Shen et al. |
| 6,631,239 B1 | 10/2003 | Hamada |
| 8,068,154 B2 | 11/2011 | Jacob et al. |
| 2002/0196986 A1 | 12/2002 | Mcintyre |
| 2005/0264693 A1 | 12/2005 | Kondo et al. |
| 2008/0316360 A1 | 12/2008 | Kondo et al. |
| 2009/0175551 A1 | 7/2009 | Thorn |

(Continued)

OTHER PUBLICATIONS

"Choose an upload size," Picasa 3.9, Google, accessed at http://web.archive.org/web/20130116151731/http://support.google.com/picasa/answer/106867?hl=en&ref_topic=1751920, Oct. 16, 2012, pp. 2.

(Continued)

*Primary Examiner* — Li Liu (57) ABSTRACT

A method performed under control of a storage manager may include identifying a subject of an image; determining a resolution value for the image based, at least in part, on the identified subject; and modifying a resolution of the image in accordance with the determined resolution value.

23 Claims, 9 Drawing Sheets

(56) References Cited

U.S. PATENT DOCUMENTS

| | | | |
|---|---|---|---|
| 2011/0141114 A1* | 6/2011 | Chen | G06F 3/012 345/428 |
| 2011/0188770 A1 | 8/2011 | Weinberger et al. | |
| 2015/0213786 A1* | 7/2015 | Mamajiwala | G06K 9/00255 345/428 |
| 2015/0341535 A1 | 11/2015 | Forutanpour et al. | |
| 2015/0371422 A1 | 12/2015 | Kokemohr | |

OTHER PUBLICATIONS

"Image compression," accessed at http://web.archive.org/web/20140305225625/http://en.wikipedia.org/wiki/Image_compression, last modified on Jan. 15, 2014, pp. 2.

Creusere:, C.D., and Nevel, A.V., "Automatic Target Recognition directed Image Compression," Journal of Aircraft, vol. 36, No. 4, pp. 626-631 (Jul.-Aug. 1999).

Han, S., and Vasconcelos, N., "Object-based regions of interest for image compression," IEEE Data Compression Conference, pp. 132-141 (Mar. 25-27, 2008).

International Search Report and Written Opinion for International Application No. PCT/US14/36065, dated Sep. 18, 2014.

* cited by examiner

| SUBJECT TYPE | | HISTORY OF HIGH RESOLUTION | HISTORY OF LOW RESOLUTION | PREFERRED RESOLUTION |
|---|---|---|---|---|
| PORTRAIT | A | 240 | 0 | HIGH |
| | B | 1 | 10 | LOW |
| | C | 32 | 5 | HIGH |
| LANDSCAPE | A | 7 | 0 | HIGH |
| | B | 0 | 15 | LOW |
| PARTICULAR OBJECT | A | 0 | 27 | LOW |
| | B | 3 | 50 | LOW |
| | C | 100 | 27 | HIGH |

FIG. 7

| SUBJECT TYPE | | PREFERRED RESOLUTION (USER SETTING) |
|---|---|---|
| PORTRAIT | A | HIGH |
| | B | HIGH |
| LANDSCAPE | A | LOW |
| | B | HIGH |
| | C | LOW |
| PARTICULAR OBJECT | A | LOW |
| | B | HIGH |

IMAGE RESOLUTION MODIFICATION

CROSS-REFERENCE TO RELATED APPLICATIONS

The present application is a continuation application under 35 U.S.C. § 120 of U.S. application Ser. No. 14/785,647 filed on Oct. 20, 2015, now U.S. Pat. No. 9,710,893, which is a U.S. National Stage filing under 35 U.S.C. § 371 of International Application No. PCT/US2014/036065, filed on Apr. 30, 2014, entitled "IMAGE RESOLUTION MODIFICATION." International Application No. PCT/US2014/036065 and U.S. application Ser. No. 14/785,647, including any appendices or attachments thereof, are hereby incorporated by reference in their entirety.

BACKGROUND

As performance of digital image capturing devices improves, a single photo has become bigger in size. Taking a lot of large-sized images and managing them require big storage space, and storing and viewing a number of the large-sized images cost a lot.

SUMMARY

In an example, a method performed under control of a storage manager may include identifying a subject of an image; determining a resolution value for the image based, at least in part, on the identified subject; and modifying a resolution of the image in accordance with the determined resolution value.

In another example, a user device may include an image capturing unit configured to capture an image of a subject; a subject identification unit configured to identify the subject; a resolution determination unit configured to determine a resolution value for the image based, at least in part, on the identified subject; a resolution modification unit configured to modify a resolution of the image in accordance with the determined resolution value; and a storage unit configured to store the resolution-modified image.

In yet another example, a server device may include an image receiver unit configured to receive an image from a user device; a subject identification unit configured to identify a subject of the image; a resolution determination unit configured to determine a resolution value for the image based, at least in part, on the identified subject; a resolution modification unit configured to modify a resolution of the image in accordance with the determined resolution value; and a storage unit configured to store the resolution-modified image.

In yet another example, a computer-readable storage medium may store thereon computer-executable instructions that, in response to execution, cause a user device to perform operations including identifying a subject of an image; determining a resolution value for the image based, at least in part, on the identified subject; modifying a resolution of the image in accordance with the determined resolution value; and transmitting the resolution-modified image to a server device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. With the understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatuses, systems, devices, and computer program products related to an image resolution modification scheme. Technologies are generally described for schemes modifying a resolution of an image based on a subject of the image.

In some embodiments, a storage manager, which may be hosted on at least one of a user device or a server device, may cause at least one of the user device or the server device to perform operations for the image resolution modification scheme. In some embodiments, the storage manager may cause at least one of the user device or the server device to identify a subject of an image. By way of example, but not limitation, the image may be captured by the user device or retrieved from a storage unit operatively coupled to the user device, and/or transmitted from the user device to the server device via a network to identify the subject of the image. The subject of the image may be identified based on a tag of the image and/or any other well known object recognition technique. In some embodiments, the storage manager may cause at least one of the user device or the server device to determine a resolution value for the image based on the identified subject. By way of example, but not limitation, the resolution value may be determined based on a resolution usage history database and/or a user setting database. In some embodiments, the storage manager may cause at least one of the user device or the server device to modify a resolution of the image in accordance with the determined resolution value. In some embodiments, the storage manager may cause at least one of the user device or the server device to store the resolution-modified image in the storage unit of the user device and/or a storage unit operatively coupled to the server device.

Figure 1:
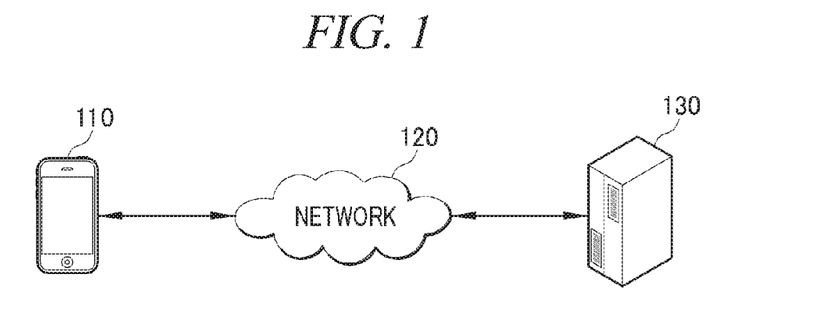
FIG. 1 shows an illustrative example of an image resolution modification environment including a user device, a network and a server device, arranged in accordance with at least some embodiments described herein.

FIG. 1 shows an illustrative example of an image resolution modification environment 100 including a user device 110, a network 120 and a server device 130, arranged in accordance with at least some embodiments described herein. As depicted, user device 110 and server device 130 may be communicatively connected to each other via network 120. By way of example, but not limitation, the network may be implemented in accordance with the Internet, a wireless network, a cellular network, a wide area network (WAN), a metropolitan area network (MAN), a local area network (LAN), a campus area network (CAN), a virtual private network (VPN), etc.

In some embodiments, user device 110 may be any type of electronic devices configured to capture, scan, photocopy, store, process, upload and/or transmit an image. By way of example, but not limitation, user device 110 may comprise a camera, a scanner, a photocopier, a smart phone, a mobile phone, a personal digital assistant (PDA), a tablet, a hybrid of the aforementioned devices, a personal computer such as a laptop computer, a desktop computer, or the like.

In some embodiments, user device 110 may be configured to capture an image of a subject. By way of example, but not limitation, the image may be captured by an internal camera. In some other embodiments, user device 110 may be configured to scan and/or photocopy an image. By way of example, but not limitation, at least one of the captured image (such as a picture), the scanned image or the photocopied image may be generated by an external device operatively coupled to user device 110. In some embodiments, the generated image may be stored in a storage unit of user device 110.

In some embodiments, user device 110 may be configured to identify the subject of the image. In some embodiments, user device 110 may be configured to identify the subject of the image based on a tag of the image. By way of example, but not limitation, a type of the subject, such as, for example, a portrait, a landscape, a particular object or the like, may be stored in the tag by a user. In some embodiments, user device 110 may be configured to identify the subject of the image based on any well-known object recognition technique. By way of example, but not limitation, the type of the subject such as the portrait may be identified based on a face recognition technique.

In some embodiments, user device 110 may be configured to determine a resolution value for the image based on the identified subject. In some embodiments, user device 110 may be configured to determine the resolution value for the image based on a resolution usage history database. The resolution usage history database may be stored in the storage unit of user device 110 to include resolution usage history data of prior images. For example, some images may be stored at a high resolution value while some other images may be stored at a low resolution value according to the user's preference and/or characteristics of corresponding image. The resolution usage history data may include a resolution value of each of the prior images regarding each identified subject. In some embodiments, user device 110 may look up one or more resolution values corresponding to the identified subject in the resolution usage history database. By way of example, but not limitation, the most frequently-used resolution value among the one or more resolution values corresponding to the identified subject may be determined as the resolution value for the image. More detailed descriptions relating to the resolution usage history database will be provided with regard to FIG. 6 below.

In some embodiments, user device 110 may be configured to determine the resolution value for the image based on a user setting database. In some embodiments, the user setting database may be stored in the storage unit of user device 110 to include user setting data. For example, as described above, some images may be stored at the high resolution value while some other images may be stored at the low resolution value according to the user's preference and/or characteristics of corresponding image. The user may set up each preferred resolution value, in the user setting database, for each subject of an image. In some embodiments, user device 110 may look up the preferred resolution value corresponding to the identified subject of the image in the user setting database. By way of example, but not limitation, the corresponding preferred resolution value may be determined as the resolution value for the image. It will be described in more details about the user setting database with reference to FIG. 7 below.

In some embodiments, user device 110 may be configured to modify a resolution of the image in accordance with the determined resolution value. In some embodiments, the user device 110 may be configured to generate the resolution-modified image based on the determined resolution value. In some embodiments, the resolution-modified image may be stored in the storage unit of user device 110. Further, user device 110 may be configured to transmit the resolution-modified image to server device 130. Server device 130 may then be configured to store the resolution-modified image in a storage unit operatively coupled to server device 130.

Additionally and/or alternatively, user device 110 may be configured to transmit the image (which may be captured by the internal camera or retrieved from the storage unit of user device 110) to server device 130 for identification of the subject of the image. In such cases, server device 130 may be configured to receive the image from user device 110 and identify the subject of the image. In some embodiments, server device 130 may be configured to identify the subject of the image based on a tag of the image. By way of example, but not limitation, a type of the subject, such as, for example, a portrait, a landscape, a particular object or the like, may be stored in the tag by the user. In some embodiments, server device 130 may be configured to identify the subject of the image based on any well-known object recognition technique. By way of example, but not limitation, the type of the subject such as the portrait may be identified based on a face recognition technique.

In some embodiments, server device 130 may be configured to determine a resolution value for the image based on the identified subject. In some embodiments, server device 130 may be configured to determine the resolution value for the image based on a resolution usage history database. The resolution usage history database may be stored in a storage unit operatively coupled to server device 130 to include resolution usage history data of prior images. For example, some images may be stored at a high resolution value while some other images may be stored at a low resolution value according to the user's preference and/or characteristics of corresponding image. Any actions, functions and/or operations relating to the resolution usage history database may correspond to those described above regarding the resolution usage history database stored in the storage unit of user device 110 and/or will be described with reference to FIG. 6 below.

In some embodiments, server device 130 may be configured to determine the resolution value for the image based on a user setting database. In some embodiments, the user setting database may be stored in the storage unit operatively coupled to server device 130 to include user setting data. Any actions, functions and/or operations relating to the user setting database may correspond to those described above regarding the user setting database stored in the storage unit of user device 110 and/or will be described with reference to FIG. 7 below.

In some embodiments, server device 130 may be configured to modify a resolution of the image in accordance with the determined resolution value. In some embodiments, server device 130 may be configured to generate the resolution-modified image based on the determined resolution value. In some embodiments, server device 130 may be configured to store the resolution-modified image in the storage unit operatively coupled to server device 130.

The actions, functions and/or operations by user device 110 and/or server device 130 as described with reference to FIG. 1 above may be performed by a storage manager, which may be hosted on at least one of user device 110 or server device 130. For example, some or all of the actions, functions and/or operations may be performed separately and/or collectively by the storage manager hosted on at least one of user device 110 or server device 130. In some embodiments, the storage manager hosted on user device 110 may cause user device 110 to transmit, to server device 130, an image of a subject (which may be captured by and/or stored in user device 110), and then the storage manager hosted on server device 130 may cause server device 130 to identify the subject of the image transmitted from user device 110, determine a resolution value for the image based on the identified subject, modify a resolution of the image according to the determined resolution value, and store the resolution-modified image in the storage unit operatively coupled to server device 130. In some other embodiments, the storage manager hosted on user device 110 may cause user device 110 to identify a subject of an image captured by and/or stored in user device 110, determine a resolution value for the image based on the identified subject, modify a resolution of the image according to the determined resolution value, and transmit the resolution-modified image to server device 130. Then the storage manager hosted on server device 130 may cause server device 130 to store the resolution-modified image transmitted from user device 110 in the storage unit operatively coupled to server device 130.

In some embodiments, the actions, functions and/or operations described with reference to FIG. 1 above may be performed by user device 110 when it captures an image with the internal camera. For example, user device 110 may identify a subject (which may be shown in a camera viewfinder) to be captured as an image, determine a resolution value for the image based on the identified subject (by way of example, but not limitation, using the resolution usage history database and/or the user setting database), and capture the image with the determined resolution value. The captured image may then be stored in the storage unit of user device 110 and/or transmitted to server device 130.

Figure 2:
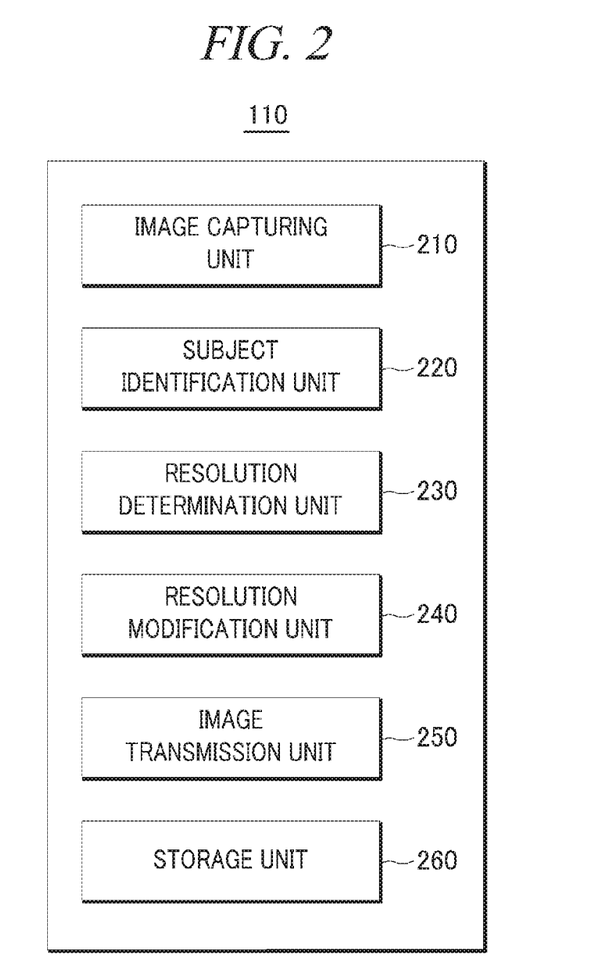
FIG. 2 shows a block diagram of an example architecture for a user device, arranged in accordance with at least some embodiments described herein.

FIG. 2 shows a block diagram of an example architecture for user device 110, arranged in accordance with at least some embodiments described herein. As depicted in FIG. 2, user device 110 may include an image capturing unit 210, a subject identification unit 220, a resolution determination unit 230, a resolution modification unit 240, an image transmission unit 250 and a storage unit 260. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of image capturing unit 210, subject identification unit 220, resolution determination unit 230, resolution modification unit 240, image transmission unit 250 and storage unit 260 may be included in an instance of an application, such as a storage manager, hosted by user device 110. Further, reference may be made to the embodiments depicted and described with reference to FIG. 1.

Image capturing unit 210 may be configured to capture an image of a subject. By way of example, but not limitation, image capturing unit 210 may be a camera operatively coupled to and/or included in user device 110.

Subject identification unit 220 may be configured to identify the subject of the image. In some embodiments, subject identification unit 220 may be configured to identify the subject of the image based on a tag of the image. Alternatively, subject identification unit 220 may be configured to identify the subject of the image based on any other well-known object recognition technique. By way of example, but not limitation, information associated with the subject such as a type of the subject may be stored in the tag by a user. Further, the type of the subject may be at least one of a portrait, a landscape or a particular object.

Resolution determination unit 230 may be configured to determine a resolution value for the image based on the identified subject. In some embodiments, resolution determination unit 230 may be configured to determine the resolution value for the image based on a resolution usage history database. The resolution usage history database may include resolution usage history data of prior images. The resolution usage history data may include a resolution value (such as, for example, a high resolution value or a low resolution value) of each of the prior images regarding each identified subject. In some embodiments, resolution determination unit 230 may look up one or more resolution values corresponding to the identified subject in the resolution usage history database, such that the most frequently-used resolution value corresponding to the identified subject may be determined as the resolution value for the image.

In some embodiments, resolution determination unit 230 may be configured to determine the resolution value for the image based on a user setting database. The user may set up each preferred resolution value (such as, for example, the high resolution value or the low resolution value), in the user setting database, for each subject of an image. In some embodiments, resolution determination unit 230 may look up the preferred resolution value corresponding to the identified subject of the image in the user setting database such that the corresponding preferred resolution value may be determined as the resolution value for the image.

Resolution modification unit 240 may be configured to modify a resolution of the image in accordance with the determined resolution value. In some embodiments, resolution modification unit 240 may be configured to generate the resolution-modified image based on the determined resolution value.

Image transmission unit 250 may be configured to transmit the resolution-modified image to a server device (such as, for example, server device 130). Additionally and/or alternatively, image transmission unit 250 may be configured to transmit, to server device 130, the image captured by image capturing unit 210 and/or stored in storage unit 260 for any modification by server device 130.

Storage unit 260 may be configured to store the resolution-modified image and/or the image captured by image capturing unit 210. Further, storage unit 260 may store other images, such as, for example, downloaded images, images received from other user devices, etc., which may be modified by resolution modification unit 240 and/or transmitted to server device 130 by image transmission unit 250. In some embodiments, storage unit 260 may be configured to store at least one of the resolution usage history database or the user setting database.

Figure 3:
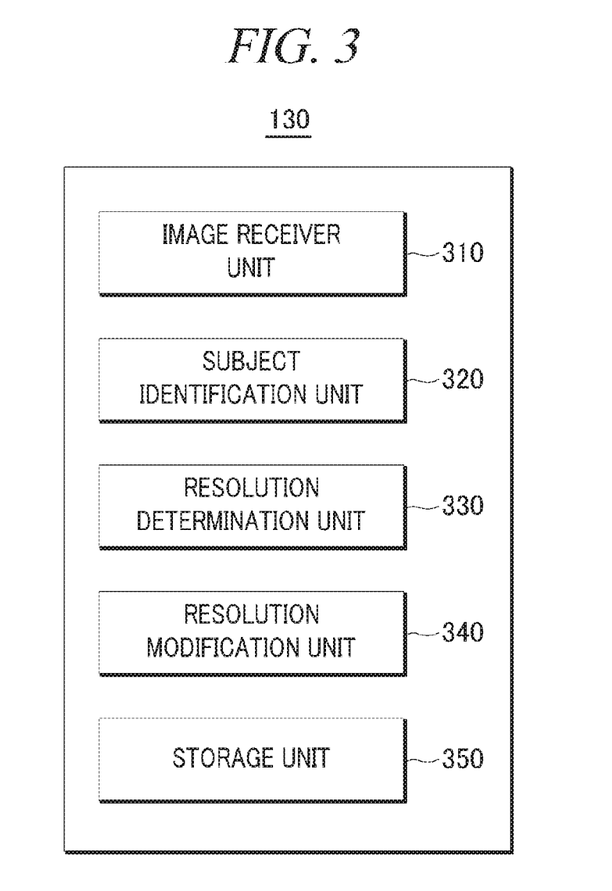
FIG. 3 shows a block diagram of an example architecture for a server device, arranged in accordance with at least some embodiments described herein.

FIG. 3 shows a block diagram of an example architecture for server device 130, arranged in accordance with at least some embodiments described herein. As depicted in FIG. 3, server device 130 may include an image receiver unit 310, a subject identification unit 320, a resolution determination unit 330, a resolution modification unit 340 and a storage unit 350. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or virtually any combination thereof. In that regard, one or more of image receiver unit 310, subject identification unit 320, resolution determination unit 330, resolution modification unit 340 and storage unit 350 may be included in an instance of an application, such as a storage manager, hosted by server device 130. Further, reference may be made to the embodiments depicted and described with reference to FIG. 1.

Image receiver unit 310 may be configured to receive an image from user device 110. By way of example, but not limitation, the image may be captured by the internal camera or retrieved from storage unit 260 of user device 110.

Subject identification unit 320 may be configured to identify the subject of the image. In some embodiments, subject identification unit 320 may be configured to identify the subject of the image based on a tag of the image. Alternatively, subject identification unit 320 may be configured to identify the subject of the image based on any other well-known object recognition technique. By way of example, but not limitation, information associated with the subject such as a type of the subject may be stored in the tag by a user. Further, the type of the subject may be at least one of a portrait, a landscape or a particular object.

Resolution determination unit 330 may be configured to determine a resolution value for the image based on the identified subject. In some embodiments, resolution determination unit 330 may be configured to determine the resolution value for the image based on a resolution usage history database. The resolution usage history database may include resolution usage history data of prior images. The resolution usage history data may include a resolution value (such as, for example, a high resolution value or a low resolution value) of each of the prior images regarding each identified subject. In some embodiments, resolution determination unit 330 may look up one or more used resolution values corresponding to the identified subject in the resolution usage history database, such that the most frequently-used resolution value corresponding to the identified subject may be determined as the resolution value for the image.

In some embodiments, resolution determination unit 330 may be configured to determine the resolution value for the image based on a user setting database. The user may set up each preferred resolution value (such as, for example, the high resolution value or the low resolution value), in the user setting database, for each subject of an image. In some embodiments, resolution determination unit 330 may look up the preferred resolution value corresponding to the identified subject of the image in the user setting database such that the corresponding preferred resolution value may be determined as the resolution value for the image.

Resolution modification unit 340 may be configured to modify a resolution of the image in accordance with the determined resolution value. In some embodiments, resolution modification unit 340 may be configured to generate the resolution-modified image based on the determined resolution value.

Storage unit 350 may be configured to store the resolution-modified image. In some embodiments, storage unit 350 may be configured to store at least one of the resolution usage history database or the user setting database.

Figure 4:
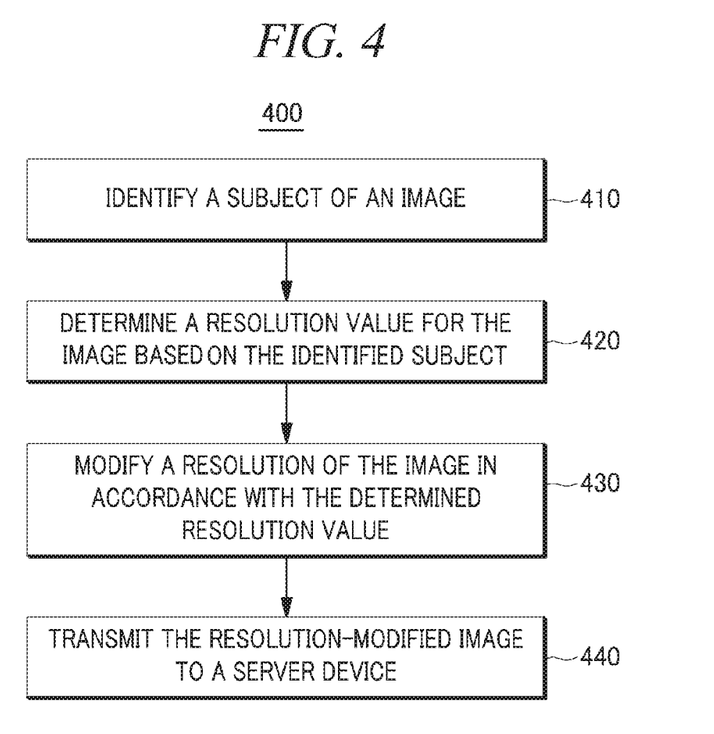
FIG. 4 shows an example flow diagram of a process of a user device to perform an image resolution modification scheme, arranged in accordance with at least some embodiments described herein.

FIG. 4 shows an example flow diagram of a process 400 of a user device to perform an image resolution modification scheme, arranged in accordance with at least some embodiments described herein. The operations of process 400 may be implemented in image resolution modification environment 100 including user device 110, network 120 and server device 130, as illustrated in FIGS. 1-3. Process 400 may include one or more operations, actions, or functions as illustrated by one or more blocks 410, 420, 430 and/or 440. Although illustrated as discrete blocks, various blocks may be divided into additional blocks, combined into fewer blocks, or eliminated, depending on the desired implementation. Processing may begin at block 410.

At block 410 (Identify a Subject of an Image), the user device (such as, for example, subject identification unit 220 of user device 110) may identify a subject of an image. By way of example, but not limitation, the image may be captured by user device 110 or retrieved from a storage unit of user device 110. In some embodiments, user device 110 may identify the subject of the image based on a tag of the image. Alternatively, user device 110 may identify the subject of the image based on any other well-known object recognition technique. By way of example, but not limitation, information associated with the subject such as a type of the subject may be stored in the tag by a user. Processing may proceed from block 410 to block 420.

At block 420 (Determine a Resolution Value for the Image Based on the Identified Subject), the user device (such as, for example, resolution determination unit 230 of user device 110) may determine a resolution value for the image based on the identified subject. In some embodiments, user device 110 may determine the resolution value for the image based on a resolution usage history database and/or a user setting database. The resolution usage history database and/or the user setting database may include those described with reference FIGS. 1 and 2 above. Processing may proceed from block 420 to block 430.

At block 430 (Modify a Resolution of the Image in Accordance with the Determined Resolution Value), the user device (such as, for example, resolution modification unit 240 of user device 110) may modify a resolution of the image in accordance with the determined resolution value. In some embodiments, user device 110 may generate the resolution-modified image based on the determined resolution value. In some embodiments, user device 110 may store the resolution-modified image in the storage unit of user device 110. Processing may proceed from block 430 to block 440.

At block 440 (Transmit the Resolution-Modified Image to a Server Device), the user device (such as, for example, image transmission unit 250 of user device 110) may transmit the resolution-modified image to a server device (such as, for example, server device 130).

Figure 5:
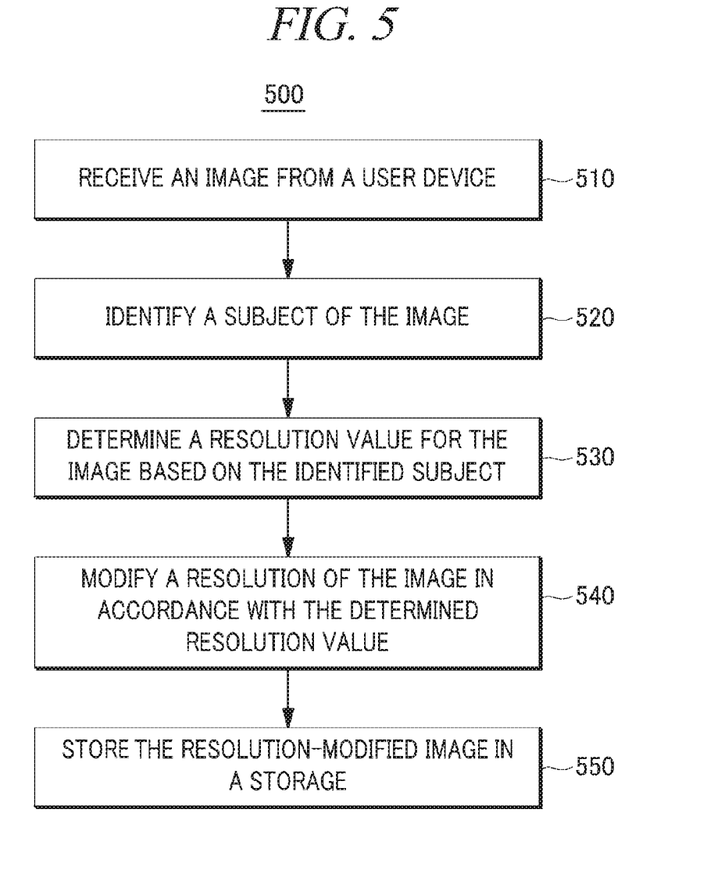
FIG. 5 shows an example flow diagram of a process of a server device to perform an image resolution modification scheme, arranged in accordance with at least some embodiments described herein.

FIG. 5 shows an example flow diagram of a process 500 of a server device to perform an image resolution modification scheme, arranged in accordance with at least some embodiments described herein. The operations of process 500 may be implemented in image resolution modification environment 100 including user device 110, network 120 and server device 130, as illustrated in FIGS. 1-3. Process 500 may include one or more operations, actions, or functions as illustrated by one or more blocks 510, 520, 530, 540 and/or 550. Although illustrated as discrete blocks, various blocks may be divided into additional blocks, combined into fewer blocks, or eliminated, depending on the desired implementation. Processing may begin at block 510.

At block 510 (Receive an Image from a User Device), the server device (such as, for example, image receiver unit 310 of user device 110) may receive an image from a user device (such as, for example, user device 110). By way of example, but not limitation, the image may be captured by an internal camera or retrieved from a storage unit of user device 110. Processing may proceed from block 510 to block 520.

At block 520 (Identify a Subject of the Image), a server device (such as, for example, subject identification unit 320 of server device 110) may identify a subject of the image. In some embodiments, server device 130 may identify the subject of the image based on a tag of the image. Alternatively, server device 130 may identify the subject of the image based on any other well-known object recognition technique. By way of example, but not limitation, information associated with the subject such as a type of the subject may be stored in the tag by a user. Processing may proceed from block 520 to block 530.

At block 530 (Determine a Resolution Value for the Image Based on the Identified Subject), the server device (such as, for example, resolution determination unit 330 of server device 130) may determine a resolution value for the image based on the identified subject. In some embodiments, server device 130 may determine the resolution value for the image based on a resolution usage history database and/or a user setting database. The resolution usage history database and/or the user setting database may include those described with reference FIGS. 1 and 3 above. Processing may proceed from block 530 to block 540.

At block 540 (Modify a Resolution of the Image in Accordance with the Determined Resolution Value), the server device (such as, for example, resolution modification unit 340 of server device 130) may modify a resolution of the image in accordance with the determined resolution value. In some embodiments, server device 130 may generate the resolution-modified image based on the determined resolution value. Processing may proceed from block 540 to block 550.

At block 550 (Store the Resolution-Modified Image in a Storage), the server device (such as, for example, storage unit 350 of server device 130) may store the resolution-modified image.

Figure 6:
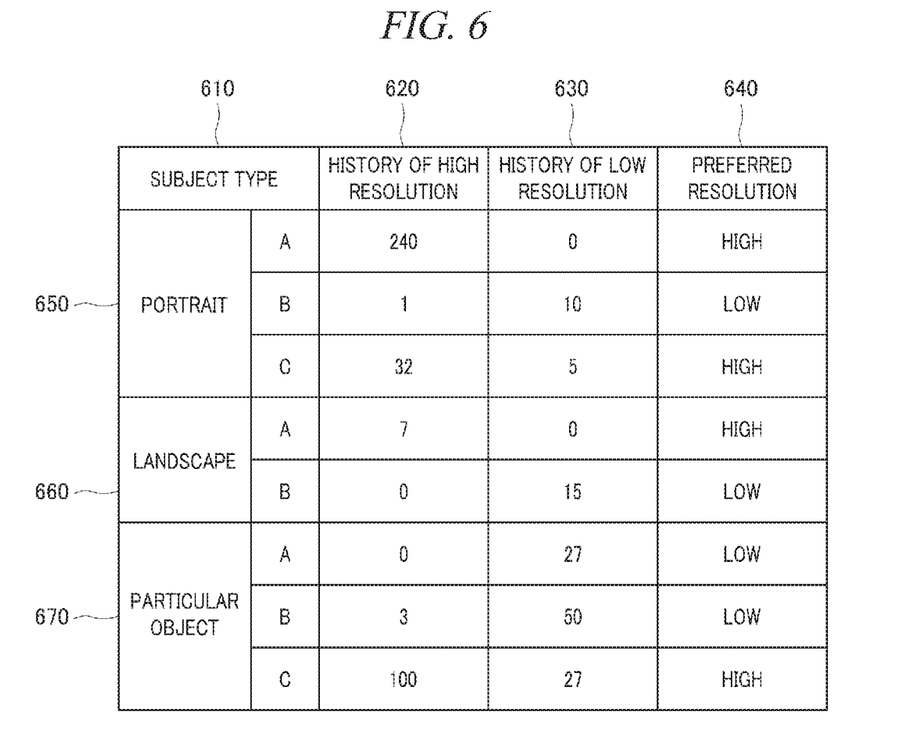
FIG. 6 shows an example of a look-up table to implement at least one example embodiment of an image resolution modification scheme, arranged in accordance with at least some embodiments described herein.

FIG. 6 shows an example of a look-up table to implement at least one example embodiment of an image resolution modification scheme, arranged in accordance with at least some embodiments described herein. Reference may be made to the embodiments depicted and described with reference to FIGS. 1-5.

As depicted in FIG. 6, a first column 610 may indicate a type of an identified subject of one or more images; second and third columns 620 to 630 may indicate a resolution usage history data for a high resolution value and a low resolution value, respectively, regarding the type of the identified subject; and a forth column 640 may indicate a preferred resolution value based on the resolution usage history data. Further, rows 650-670 may indicate how to determine the preferred resolution value corresponding to each type of the identified subjects based on the resolution usage history data.

In some embodiments, the look-up table may be stored in at least one of a resolution usage history database of user device 110 or a resolution usage history database of server device 130. Further, the look-up table may be referenced by resolution determination unit 230 of user device 110 and/or resolution determination unit 330 of server device 130 to determine the preferred resolution value for the image based on the identified subject. In accordance with one non-limiting example, when the one or more images regarding a identified subject has been stored more frequently at the high resolution value, user device 110 (for example, resolution modification unit 230) and/or server device 130 (for example, resolution modification unit 330) may determine the preferred resolution value for the image as the high resolution value. On the other hand, when the one or more images for a identified subject have been used more frequently at the low resolution value, user device 110 (for example, resolution modification unit 230) and/or server device 130 (for example, resolution modification unit 330) may determine the preferred resolution value for the image as the low resolution value. For instance, if a portrait A of portrait type 650 has been used 240 times at the high resolution value and has no record for the low resolution value, the preferred resolution value for the portrait A of portrait type 650 may be determined as the high resolution value. Further, if a portrait B of portrait type 650 has been used 1 time at the high resolution value and 10 times at the low resolution value, the preferred resolution value for the portrait B of portrait type 650 may be determined as the low resolution value.

As such, user device 110 and/or server device 130 may be able to determine the preferred resolution value with reference to the look-up table. One skilled in the art would appreciate that the type of the identified subjects and the resolution values for determination illustrated in the look-up table are non-limiting example parameters and any other parameters to implement the image resolution modification scheme in accordance with multiple embodiments described here will be available for the look-up table.

Figure 7:
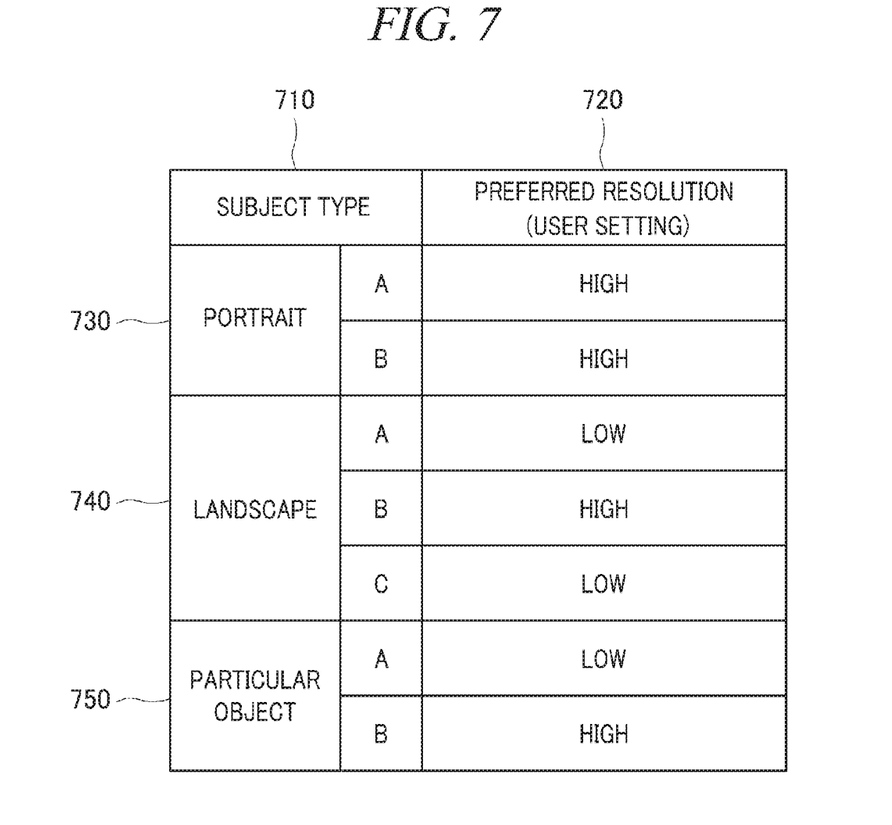
FIG. 7 shows another example of a look-up table to implement at least one example embodiment of an image resolution modification scheme, arranged in accordance with at least some embodiments described herein.

FIG. 7 shows another example of a look-up table to implement at least one example embodiment of an image resolution modification scheme, arranged in accordance with at least some embodiments described herein. Reference may be made to the embodiments depicted and described with reference to FIGS. 1-5.

As depicted in FIG. 7, a first column 710 may indicate a type of an identified subject; and second column 720 may indicate a user setting data that a user set up as a preferred resolution value for each type of the identified subjects. Further, rows 730-750 may indicate the user setting data for the type of the identified subjects, respectively.

In some embodiments, the look-up table may be stored in at least one of a user setting database of user device 110 or a user setting database of server device 130. Further, the look-up table may be referenced by resolution determination unit 230 of user device 110 and/or resolution determination unit 330 of server device 130 to determine the preferred resolution value for the image based on the identified subject. In accordance with one non-limiting example, when the preferred resolution value for the type of the identified subject has been set up by the user as a high resolution value, user device 110 (for example, resolution modification unit 230) and/or server device 130 (for example, resolution modification unit 330) may determine the preferred resolution value for the image as the high resolution value. For instance, if the preferred resolution for a portrait A of portrait type 730 has been set up as the high resolution value, the preferred resolution value for the portrait A of portrait type 730 may be determined as the high resolution value.

As such, user device 110 and/or server device 130 may be able to determine the preferred resolution value with reference to the look-up table. One skilled in the art would appreciate that the type of the identified subject and the resolution values for determination illustrated in the look-up table are non-limiting example parameters and any other parameters to implement the image resolution modification scheme in accordance with multiple embodiments described here will be available for the look-up table.

Figure 8:
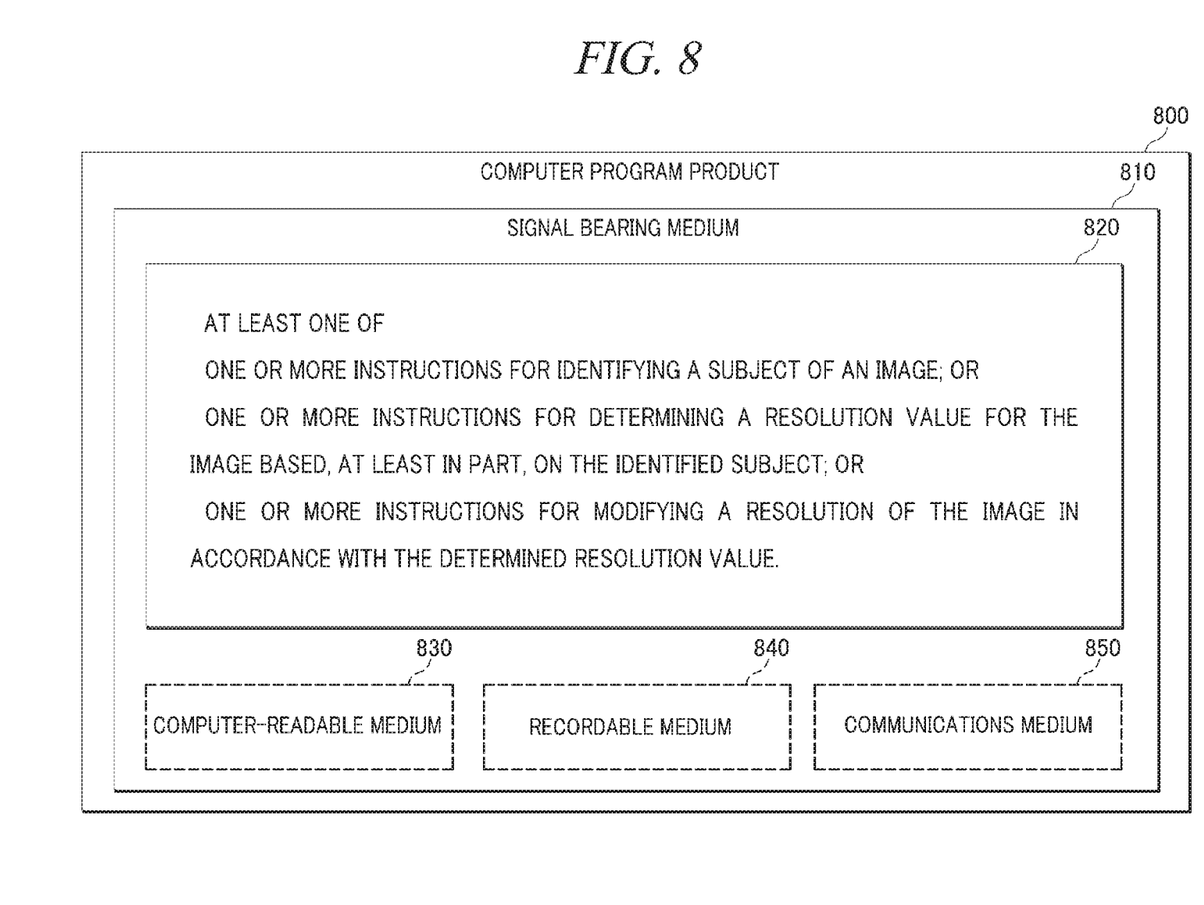
FIG. 8 illustrates an example computer program products that may be utilized to provide an image resolution modification scheme, arranged in accordance with at least some embodiments described herein.

FIG. 8 illustrates computer program products 800 that may be utilized to provide an image resolution modification scheme, arranged in accordance with at least some embodiments described herein. Computer program product 800 may include a signal bearing medium 810. Signal bearing medium 810 may include one or more instructions 820 that, when executed by, for example, a user device and/or a server device, may provide the functionality described above with respect to FIGS. 1-7. By way of example, but not limitation, instructions 820 may include: one or more instructions for identifying a subject of an image; one or more instructions for determining a resolution value for the image based, at least in part, on the identified subject; or one or more instructions for modifying a resolution of the image in accordance with the determined resolution value. Thus, for example, referring to FIG. 5 and/or FIG. 6, user device 110 and/or server device 130 may undertake one or more of the blocks shown in FIG. 5 and/or FIG. 6 in response to instructions 820.

In some implementations, signal bearing medium 810 may encompass a computer-readable medium 830, such as, but not limited to, a hard disk drive (HDD), a compact disk (CD), a digital versatile disk (DVD), a digital tape, memory, etc. In some implementations, signal bearing medium 810 may encompass a recordable medium 840, such as, but not limited to, memory, read/write (R/W) CDs, R/W DVDs, etc. In some implementations, signal bearing medium 810 may encompass a communications medium 850, such as, but not limited to, a digital and/or an analog communication medium (e.g., a fiber optic cable, a waveguide, a wired communications link, a wireless communication link, etc). Thus, for example, computer program product 800 may be conveyed to one or more modules of user device 110 and/or server device 130 by an RF signal bearing medium 820, where the signal bearing medium 820 is conveyed by a wireless communications medium 850 (e.g., a wireless communications medium conforming with the IEEE 802.11 standard).

Figure 9:
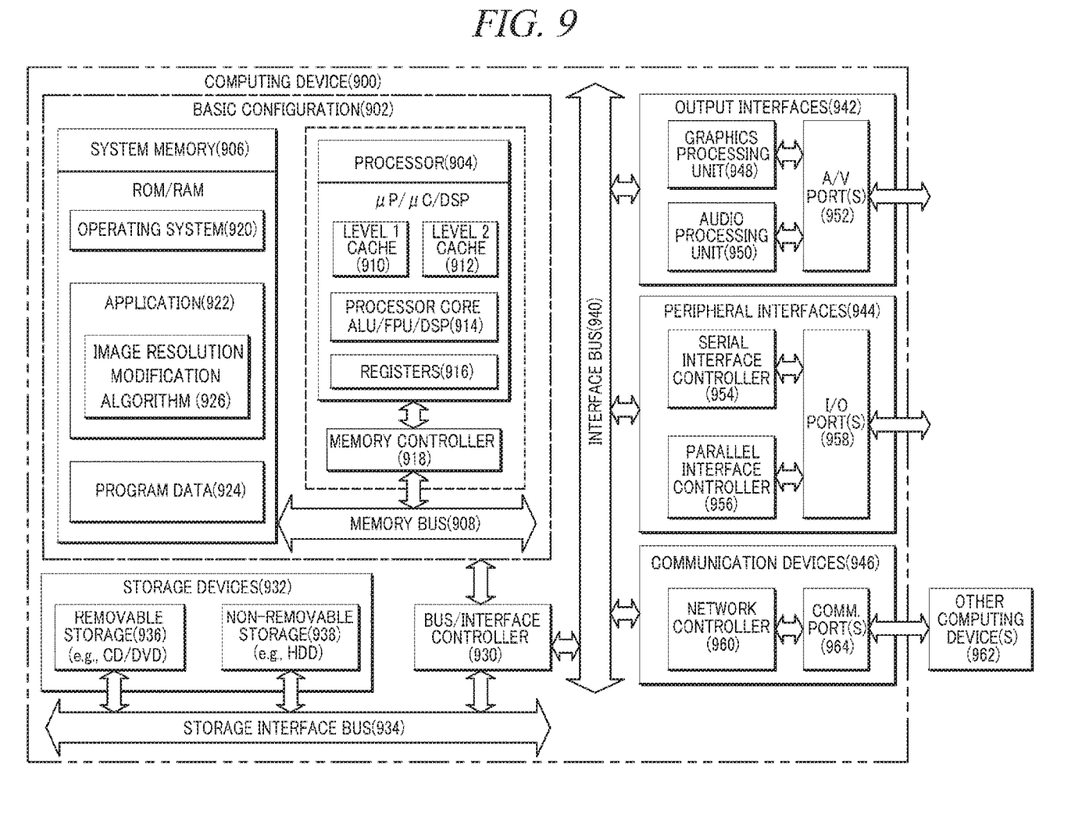
FIG. 9 is a block diagram illustrating an example computing device that may be utilized to provide an image resolution modification scheme, arranged in accordance with at least some embodiments described herein.

FIG. 9 is a block diagram illustrating an example computing device that may be utilized to provide an image resolution modification scheme, arranged in accordance with at least some embodiments described herein. In these examples, elements of computing device 900 may be arranged or configured for a user device. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor ($\mu P$), a microcontroller ($\mu C$), a digital signal processor (DSP), or any combination thereof. Processor 904 may include one or more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, an application 922, and program data 924.

Application 922 may include an image resolution modification algorithm 926 that may be arranged to perform the functions as described herein including the actions described with respect to a user device architecture as shown in FIG. 2 including the actions described with respect to the flow chart shown in FIG. 4. Program data 924 may include any data that may be useful for providing the image resolution modification scheme as is described herein. In some embodiments, application 922 may be arranged to operate with program data 924 on an operating system 920 such that the scheme for modifying a resolution of an image as described herein may be provided.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of one or more processors, the method comprising:
    identifying a subject of an image, wherein the subject of the image includes one of: a portrait, a landscape, and a particular object;
    determining a resolution value for the image based on one of a resolution usage history database and a user setting database,
    wherein the resolution usage history database includes resolution usage history data that corresponds to the identified subject, and wherein the user setting database includes a particular resolution value that corresponds to the identified subject; and
    modifying a resolution of the image based on the determined resolution value.

2. The method of claim 1, further comprising:
    storing the image, having the modified resolution, in a storage unit.

3. The method of claim 1, wherein the one or more processors are hosted on a server device, and wherein the method further comprises:
    receiving the image from a user device prior to the identifying.

4. The method of claim 1, wherein the one or more processors are hosted on a user device.

5. The method of claim 4, further comprising:
    transmitting the image, having the modified resolution, to a server device.

6. The method of claim 1, wherein the identifying the subject of the image comprises identifying the subject based on one of: a tag of the image, an object recognition technique, and a face recognition technique.

7. The method of claim 1, wherein the determining the resolution value includes determining one of a high resolution value and a low resolution value.

8. The method of claim 1, wherein the determining the resolution value comprises selecting the resolution value among one or more resolution values.

9. The method of claim 1, wherein the determined resolution value corresponds to an image resolution value that is frequently used to capture or store one or more images that correspond to the identified subject.

10. The method of claim 1, wherein the resolution usage history data includes at least:
    a frequency of usage of a first resolution value for one or more subjects, which include the identified subject;
    a frequency of usage of a second resolution value for the one or more subjects, which include the identified subject; and
    a specific resolution value, among the first resolution value and the second resolution value, for the one or more subjects, which include the identified subject.

11. A device, comprising:
    one or more processors configured to perform or control performance of:
        identify a subject of an image, wherein the subject of the image corresponds to one of: a portrait, a landscape, and a particular object;
        determine a resolution value for the image based on one of a resolution usage history database and a user setting database,
        wherein the resolution usage history database includes resolution usage history data that corresponds to the identified subject, and wherein the user setting database includes a particular resolution value that corresponds to the identified subject; and
        modify a resolution of the image based on the determined resolution value.

12. The device of claim 11, further comprising:
    an image capture circuit operatively coupled to the one or more processors, wherein the image capture circuit is configured to capture the image.

13. The device of claim 11, further comprising:
    a receiver operatively coupled to the one or more processors, wherein the receiver is configured to receive the image from another device.

14. The device of claim 11, further comprising:
    a storage unit operatively coupled to the one or more processors, wherein the storage unit is configured to store the image, having the modified resolution, and at least one of the resolution usage history database and the user setting database.

15. The device of claim 11, further comprising:
    an image transmission circuit operatively coupled to the one or more processors, wherein the image transmission circuit is configured to transmit the image, having the modified resolution, to another device.

16. The device of claim 11, wherein the one or more processors are configured to perform or control performance of:
    identify the subject of the image based on one of: a tag of the image, an object recognition technique, and a face recognition technique.

17. The device of claim 11, wherein the determined resolution value corresponds to an image resolution value that is frequently used to capture or store one or more images that correspond to the identified subject.

18. A system, comprising:
a first device; and
a second device,
wherein the first device is configured to:
  capture an image; and
  transmit the captured image to the second device, and
wherein the second device is configured to:
  receive the image;
  identify a subject of the received image;
  determine a resolution value for the received image, wherein the determined resolution value corresponds to an image resolution value that is frequently used to capture or store one or more images that correspond to the identified subject;
  modify a resolution of the received image based on the determined resolution value.

19. The system of claim 18, further comprising a storage unit operatively coupled to the second device, wherein the storage unit is configured to store at least one of a resolution usage history database and a user setting database.

20. A non-transitory computer-readable storage medium having stored thereon computer-executable instructions that, in response to execution by one or more processors, cause the one or processors to perform or control performance of operations to:
  identify a subject of an image;
  determine a resolution value for the image wherein the determined resolution value corresponds to an image resolution value that is frequently used to capture or store one or more images that correspond to the identified subject;
  modify a resolution of the image based on the determined resolution value.

21. The non-transitory computer-readable storage medium of claim 20, wherein the one or more processors are hosted on a user device, and wherein the instructions, in response to execution by the one or more processors, further cause the one or more processors to perform or control performance of at least one operation to:
  transmit the resolution-modified image to a server device.

22. The non-transitory computer-readable storage medium of claim 20, wherein the instructions, in response to execution by the one or more processors, further cause the one or more processors to perform or control performance of at least one operation to:
  store the image, having the modified resolution, in a storage unit.

23. The non-transitory computer-readable storage medium of claim 20, wherein the identified subject of the image includes one of: a portrait, a landscape, and a particular object.

* * * * *